A. Weitman,
Horseshoe.
N° 49,812. Patented Sep. 5, 1865.

Witnesses:
Theo Lusch
Wm Trewin

Inventor:
A Weitman
By Munn & Co
Attys

UNITED STATES PATENT OFFICE.

AUGUSTUS WEITMAN, OF WEST UNION, IOWA.

HORSESHOE.

Specification forming part of Letters Patent No. 49,812, dated September 5, 1865.

*To all whom it may concern:*

Be it known that I, AUGUSTUS WEITMAN, of West Union, in the county of Fayette and State of Iowa, have invented a new and Improved Horseshoe; and I do hereby declare that the following is a full, clear, and exact description thereof, which will enable others skilled in the art to make and use the same, reference being had to the accompanying drawings, forming part of this specification, in which—

Figure 1:
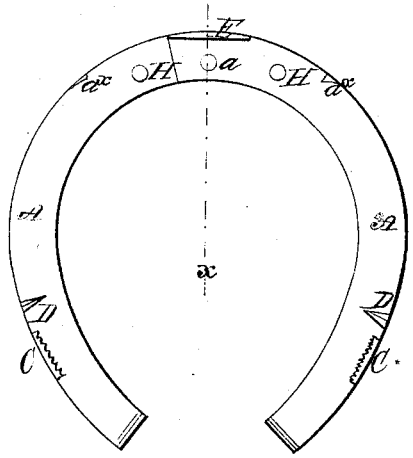
Figure 2:
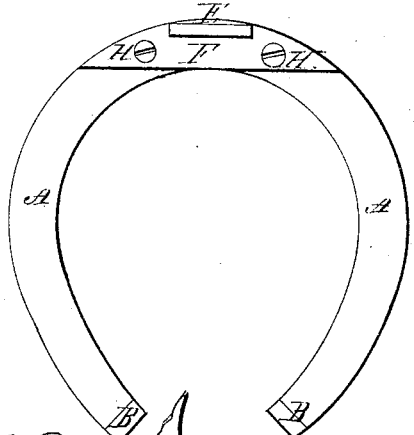
Figure 3:
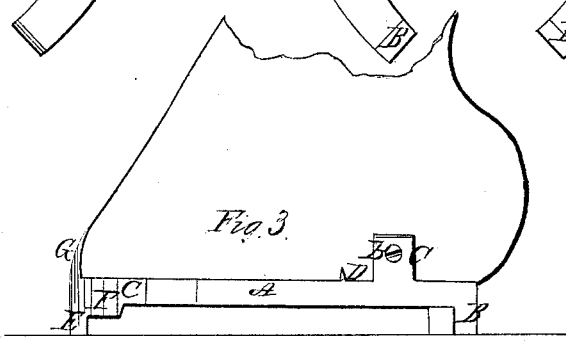
Figure 4:
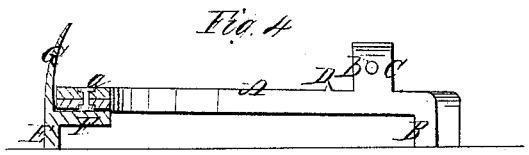

Figure 1 is a plan or top view of my invention detached from the hoof; Fig. 2, an inverted plan of the same; Fig. 3, a side view of the same attached to the hoof; Fig. 4, a longitudinal section of the same, taken in the line $x\ x$.

Similar letters of reference indicate like parts.

This invention relates to a new and useful improvement in that class of horseshoes which are attached to the hoof without the aid of nails.

The object of the invention is to obtain a means for securing the shoe to the hoof without the use of nails, and which will prevent the animal becoming hoof-bound, and at the same time firmly secure the shoe to the hoof.

The shoe is constructed of two equal parts, A A, of similar size and shape, and connected at their ends, which form the front of the shoe, by a pivot, $a$.

The parts A A are provided with calks B at their rear ends, and each of said parts has an upright flange, C, to bear against the exterior of the hoof, a screw, $b$, passing through each flange into the hoof.

On the upper surface of each part A there is a lip or spur, D, and these spurs sink into the bottom of the hoof and preserve the flanges C from strain under the pull of the animal.

E represents the toe-calk, which is formed on a plate, F, applied to the front part of the shoe. This plate F also has a flange, G, which extends up at the front side of the hoof, but has no screw passing through it. The plate F has two screws, H, passing through it, one near each end, said screws passing through the parts A A and preventing said parts from becoming detached from the hoof.

At each end of the plate F there is an upright flange, $c$, and these flanges fit in notches or recesses $a^\times$ in the outer sides of the parts A, and also have a tendency to prevent said parts from spreading.

The screws $b$, passing through the flanges C into the hoof, have a tendency to draw the latter outward or expand it, thereby preventing the animal from becoming hoof-bound, the sides or parts A A being at such a distance apart as to effect this result.

In order to detach the shoe from the foot the plate F is removed and the screws $b$ unscrewed out of the hoof.

This shoe thus applied cannot become casually detached, and may be very readily attached to and detached from the hoof.

Having thus described my invention, I claim as new and desire to secure by Letters Patent—

1. The lips or spurs D on the upper surface of each part A of the shoe, in connection with the flanges C, screws $b$, and the flange G at the front of the shoe, substantially as described.

2. Constructing the shoe of two equal parts, A A, connected at their front ends by a pivot, $a$, when used in connection with the plate F, attached to said parts by screws H, and either with or without the flanges $c$, as set forth.

AUGUSTUS WEITMAN.

Witnesses:
A. B. ECKER,
E. H. KINYON.